340-870.12 SR CROSS REFERENCE SEARCH ROOM
XR 2,961,648
X7019Y
Nov. 22, 1960 J. M. SACKS ET AL 2,961,648
RAPID REDUCTION OF TELEMETRIC DATA
Filed Aug. 23, 1957
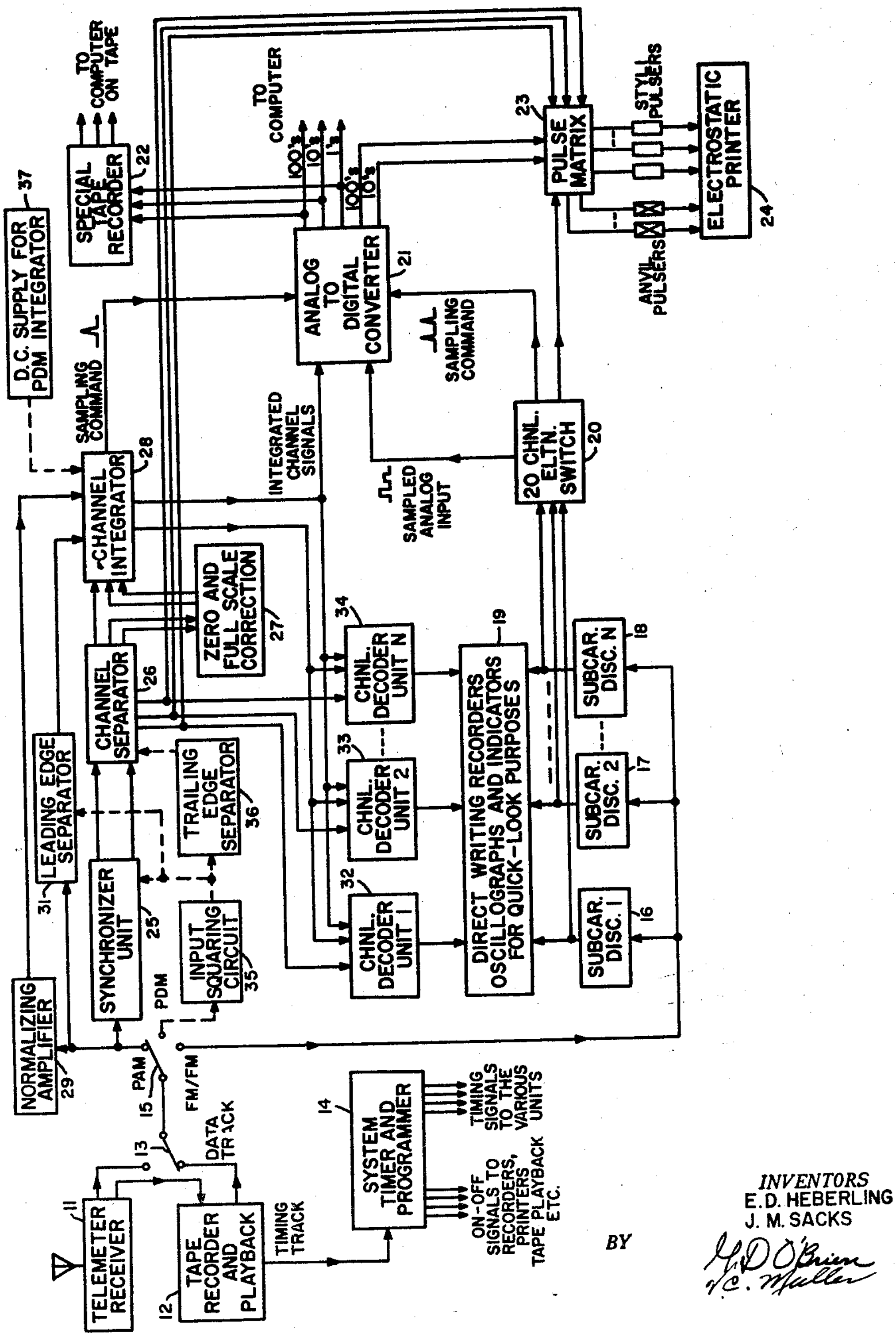
INVENTORS
E. D. HEBERLING
J. M. SACKS
BY [signature]
2961648
OR IN 340/347AD 2,961,648

RAPID REDUCTION OF TELEMETRIC DATA

Jacob M. Sacks, Corona, and Emory D. Heberling, Riverside, Calif., assignors to the United States of America as represented by the Secretary of the Navy Filed Aug. 23, 1957, Ser. No. 680,030

1 Claim. (Cl. 340—347)

(Granted under Title 35, U.S. Code (1952), sec. 266)

The invention described herein may be manufactured and used by or for the Government of the United States of America for governmental purposes without the payment of any royalties thereon or therefor.

This invention relates to rapid reduction of telemetric data and more particularly to a versatile system adapted to speed up the reduction of telemetric data from any common transmission system and digitize the data at total sampling rates of 30,000 per second or more.

Previous systems for reducing telemetric data were extremely slow and for digital analysis of data usually required recording of data and playback at much slower speeds for application to computers. Furthermore these prior systems were usually designed for use with only one form of data and required careful adjustment prior to and during use. These systems did not have adequate zero and full scale automatic calibration, and noise, signal dropout or loss of synchronization caused serious difficulties in reducing data.

One preferred embodiment of the present invention is adapted to receive the conventional telemetric signals and convert the data into analog form for direct writing recorders, oscillographs and indicators for quick look purposes and also into digital form for real time analysis and plotting of the digitized data or for high speed recording of data in binary or other code for subsequent analysis by computers in real time or at lower speed playback.

One object of the present invention is to provide a system for rapid reduction of telemetric data which is extremely versatile using many of the same circuits with instantaneous changeover by a selector switch or a prewired plug in unit for the different types of transmitted telemetered information and providing both integrated analog and digital readout with similar outputs for either PAM, PDM or FM/FM inputs.

Another object of the present invention is to provide a system which will sample telemetric data at high switching rates in excess of 30,000 per second with continuous automatic calibration correction for zero and full scale which prevents data being taken from the wrong channels during signal dropouts or loss of synchronization.

A further object of the present invention is to provide a system for rapid reduction of telemetric data which has improved synchronization between the local oscillator and the commuted input signals and does not require critical set-up adjustment.

Other objects and many of the attendant advantages of this invention will be readily appreciated as the same becomes better understood by reference to the following detailed description when considered in connection with the accompanying drawings wherein the single figure of the drawing is a block diagram illustrating one preferred embodiment of the present invention.

One preferred embodiment of the present invention is illustrated in the block diagram of the single figure of the drawing wherein a telemeter receiver 11 is adapted to receive a signal from any conventional telemeter transmitter which may be in a plane, a missile or at a remote ground station and may be transmitted by radio or wire. This signal may be any one of the well-known pulse amplitude modulated (PAM), pulse duration modulated (PDM) or frequency division multiplex (FM/FM) types as described in "Telemetry Standards for Guided Missiles, IRIG document No. 103–56 of October 9, 1956.

If desired the information received may be recorded on a tape recorder and playback device 12 and played back at a later time or transmitted directly through the system by actuation of the switch 13.

When the information is recorded a timing track may be applied to the tape and if desired may be utilized to actuate a system timer and programmer 14 for on-off signals to recorders, printers, tape playback, etc. where only a portion of the tape is being reduced, or timing signals may be applied to various units for visual observation or correlation of printed data in a conventional manner.

The information received may be PAM, PDM or FM/FM and in the latter case the switch 15 would be in the lower position so that the FM/FM signals would be applied to the conventional subcarrier discriminators such as 16, 17 and 18 for any desired number of channels.

The output of the discriminators may be applied to the direct writing recorders, oscillographs and indicators 19 for quick look purposes in the usual manner.

The system up to this point functions in a manner similar to the previous systems, however in the system of the present invention the output from the discriminators 16, 17 and 18 is also applied to an electronic switch 20 which may handle any desired number of channels, such as 20 indicated. This unit may be adjustable so that any number of channels may be handled at any time on a time shared basis.

The electronic switch 20 samples each channel and provides a sampled analog input for the analog to digital converter 21. The sample may be an instantaneous value at any time during the channel duration or may be an integrated value taken over a fixed period of time during the channel duration. The electronic switch 20 also provides a train of sampling command pulses each of which occurs, at a certain time after the start of each channel.

The sampling rate of the electronic switch 20 may be established bp a train of timing pulses from the system timer and programmer 14 or from an external source at any desired frequency. These timing pulses are used to actuate gates in the switch 20 which may be diode gates such as those disclosed in the co-pending application for a Transistorized Time Multiplexer for Telemetering by Sacks and Hill, Serial No. 680,029 filed August 23, 1957.

The analog to digital converter 21 receives the multiplexed analog input and takes a sample on each sampling command to provide a digital coded output which may be a binary code connected directly to a computer for real time analysis of data or to a special high speed tape recorder 22 from which it can be played back to a computer later at any desired speed.

The pulse matrix 23 converts the coded signals from the analog to digital converter into the proper decimal form for application to a high speed printer such as an electrostatic printer 24 to actuate the anvil pulsers and styli pulsers to produce a series of dots which form a plot of the information in each channel.

The analog to digital converter 21 may be a commercially available unit such as the "EPSCO" converter described in the instruction manual for Model B–611. The electrostatic printer 24 may be a unit such as the electrographic printer-plotter developed by Burroughs Corp. and described in the Proceedings of the 1955

Western Joint Computer Conference on page 116 in a paper by H. Epstein given on March 1–3, 1955. The special tape recorder 22 may be any recorder capable of recording at the necessary high information rate.

When the received information is a PAM signal, it is applied to the normalizing amplifier 29, the leading edge separator 31 and the synchronizer unit 25. The normalizing amplifier preserves the D.-C. component of the input signal and converts it to a form suitable for integration in the channel integrator 28. The leading edge separator 31 recognizes channel switching information in the PAM input signal and provides trigger signals to start an integration cycle in the channel integrator 28. The synchronizer unit 25 recovers frame sync information from the incoming PAM signal which in turn is used to "lock in" or synchronize a local oscillator to the channel commutation rate of the input signal by means of an automatic frequency control servo. The synchronizer unit 25 provides frame reset pulses and channel trigger pulses to the channel separator 26. The channel separator 26 provides gating signals to turn on either the proper channel decoders 32, 33 and 34 or equivalent channels in electrostatic printer 24 by means of the pulse matrix 23.

The channel integrator 28 integrates the channel information received from the normalizing amplifier 29 for a certain fixed period of the channel duration. A train of sampling pulses are generated at the termination of integration for sampling command to the analog to digital converter 21.

The zero and full scale correctors 27 provides the option of using continuous calibration information contained in the PAM input signal. This unit automatically corrects zero and full scale calibration by means of two closed loop servo systems. The proper control channels may be selected by means of a patch panel in channel separator 26 and correction signals are applied to the channel integrator 28.

The integrated output and the train of sampling pulses from the channel integrator 28 may be applied to either or both of the channel decoders 32, 33, 34 and the analog to digital converter 21. The channel decoders convert the integrated information in the selected channels to D.-C. form suitable for operating the direct writing recorders 19. The operation of the analog to digital converter 21 and following units 22, 23, 24 is identical to that described supra with reference to the FM/FM signals.

When the received information is a PDM signal, switch 15 is set to the center position. Input connections to the various blocks are reconnected as indicated by the dotted lines.

The input squaring circuit 35 normalizes the input signal whether it be differentiated pulses such as provided by certain types of tape playback equipment 12 or a square wave as provided by the receiver 11. The leading edge of the incoming signal is selected by the leading edge separator 31 and is used to initiate integration of voltage from the D.C. supply 37 at the start of each commutated channel. The trailing edge of the incoming PDM signal is selected by the trailing edge separator 36 and is applied to the channel integrator 28 via the channel separator 26 to terminate integration in accordance with the channel information. The function of all other blocks is identical to that described supra under PAM operation.

In order to speed up the reduction of telemetric data the equipment is designed to digitize data at total sampling rates up to 30,000 per second, i.e., one channel at 30,000 per second, ten channels at 3,000 per second and so on. As many as 20 continuous FM/FM channels may be handled simultaneously, or up to 100 commutated (PDM or PAM) channels may be handled, including high speed electronically commutated signals.

The need for a high sampling rate is obvious when one considers the handling of 20 time-shared channels, each requiring (say) 15 samples per cycle. At a total sampling rate of 30,000 per second this criteria would lead to a frequency response of approximately 100 cycles per second for each of the 20 time-shared channels.

The data may be recorded in binary decimal coded form to three decimal digits on magnetic tape for transport to a digital computer, or for control of tabulators. Zero and full scale signal stabilization and improved synchronizing circuitry are utilized in the handling of commutated data.

Also planned is real time speed digital function plotting for "quick look," and for real time speed recording of plots with calibration grids. The digital plotter or electrostatic printer 24 will handle up to 20 channels simultaneously with approximately 1500 individual channel samples per second. This means that with paper speeds of about 5 inches per second the digital plots look nearly like continuous curves. Function plots may be obtained without waiting for photographic processing. If desired the electrostatic printer 24 may also print out simultaneously the numerical values in each channel.

Although the coded data information will be available for magnetic digital recording to three decimal places it was considered advisable to limit the coding to two digits when plotting functions on the electrostatic printer 24.

A versatile time demodulator may be included in the system timer and programmer to provide coded decimal timing information to the digital magnetic recorder and timing markers to the plotter. Multiples of the timing frequency will be available for synchronizing the electronic switch 20 when desired.

Although pulse code modulation (PCM) is not commonly used at present the system disclosed herein can be readily adapted to this type of input.

Obviously many modifications and variations of the present invention are possible in the light of the above teachings. It is therefore to be understood that within the scope of the appended claim the invention may be practiced otherwise than as specifically described.

What is claimed is:

A system for the rapid reduction of telemetric data having improved synchronization between the local oscillator and the commuted input signals and not requiring critical setup adjustment comprising a telemeter receiver means for receiving pulse amplitude and pulse duration modulated and frequency division multiplex types of signals, said receiver means selectively connected to a synchronizer unit for receiving said pulse amplitude and pulse duration modulated input signals and develop frame and channel sync pulses and to means for sampling said frequency division multiplex input signals and providing commutated analog channel outputs with a correlated train of sampling pulses, a channel separator connected with said synchronizer unit for developing signals for separating individual channels, a leading edge separator connected to the input to said synchronizer unit for differentiating pulse amplitude and pulse duration modulated signals and to develop a leading edge pulse, a channel integrator connected to receive leading edge pulses from said leading edge separator for integrating over a certain time duration the information in each individual channel and for developing a correlated train of sampling pulses, means connected between said channel separator and said channel integrator for developing and applying automatic zero and full scale corrections to said channels, an input squaring circuit operable to receive and normalize pulse duration modulated signals connected with said synchronizer unit and said leading edge separator, trailing edge separator means connected between said squaring circuit and said channel separator, a regulated D.C. supply connected with said channel integrator for integration of pulse duration modulated input signals between the leading and trailing edges, a normalizing amplifier connected to receive pulse amplitude modulated signals and connected with said channel integrator, the output of said channel integrator and said means for sampling said frequency division multiplex input signals providing an integrated series of channel output pulses with a correlated train of sampling pulses for computer analysis.

References Cited in the file of this patent

UNITED STATES PATENTS

| | | |
|---|---|---|
| 2,207,743 | Larson | July 16, 1940 |
| 2,568,724 | Earp | Sept. 25, 1951 |
| 2,570,221 | Earp | Oct. 9, 1951 |
| 2,641,740 | Levy | June 9, 1953 |
| 2,791,746 | Bowersox | May 7, 1957 |